United States Patent

Hasegawa et al.

Patent Number: 4,522,028
Date of Patent: Jun. 11, 1985

[54] REGENERATIVE BURNER CONTROL APPARATUS

[75] Inventors: Yoji Hasegawa, Yokohama; Motohiro Shinzawa, Yokosuka, both of Japan

[73] Assignee: Nissan Motor Company, Limited, Japan

[21] Appl. No.: 581,908

[22] Filed: Feb. 21, 1984

[30] Foreign Application Priority Data

Mar. 1, 1983 [JP] Japan ................................ 58-31777

[51] Int. Cl.³ .............................................. F01N 3/02
[52] U.S. Cl. ...................................... 60/277; 55/283; 55/466; 55/DIG. 10; 55/DIG. 30; 60/286
[58] Field of Search ................. 60/274, 277, 286, 303, 60/311; 55/283, 466, DIG. 30, DIG. 10

[56] References Cited

FOREIGN PATENT DOCUMENTS

| | | |
|---|---|---|
| 54-12029 | 1/1979 | Japan . |
| 55-57637 | 4/1980 | Japan . |
| 56-115809 | 9/1981 | Japan . |
| 13114 | 1/1983 | Japan ..................................... 60/277 |

*Primary Examiner*—Douglas Hart
*Attorney, Agent, or Firm*—Lowe, King, Price & Becker

[57] ABSTRACT

An apparatus controls the operation of a regenerative burner having a glow plug operable to ignite and burn a combustible mixture supplied into the burner to burn the exhaust particles collected in a trap located in the exhaust conduit of an internal combustion engine when a trap regeneration requirement occurs. A control device is provided which detects a broken wire in the glow plug and stops the supply of combustible mixture to the burner in the presence of brokage of the glow plug wire.

6 Claims, 5 Drawing Figures

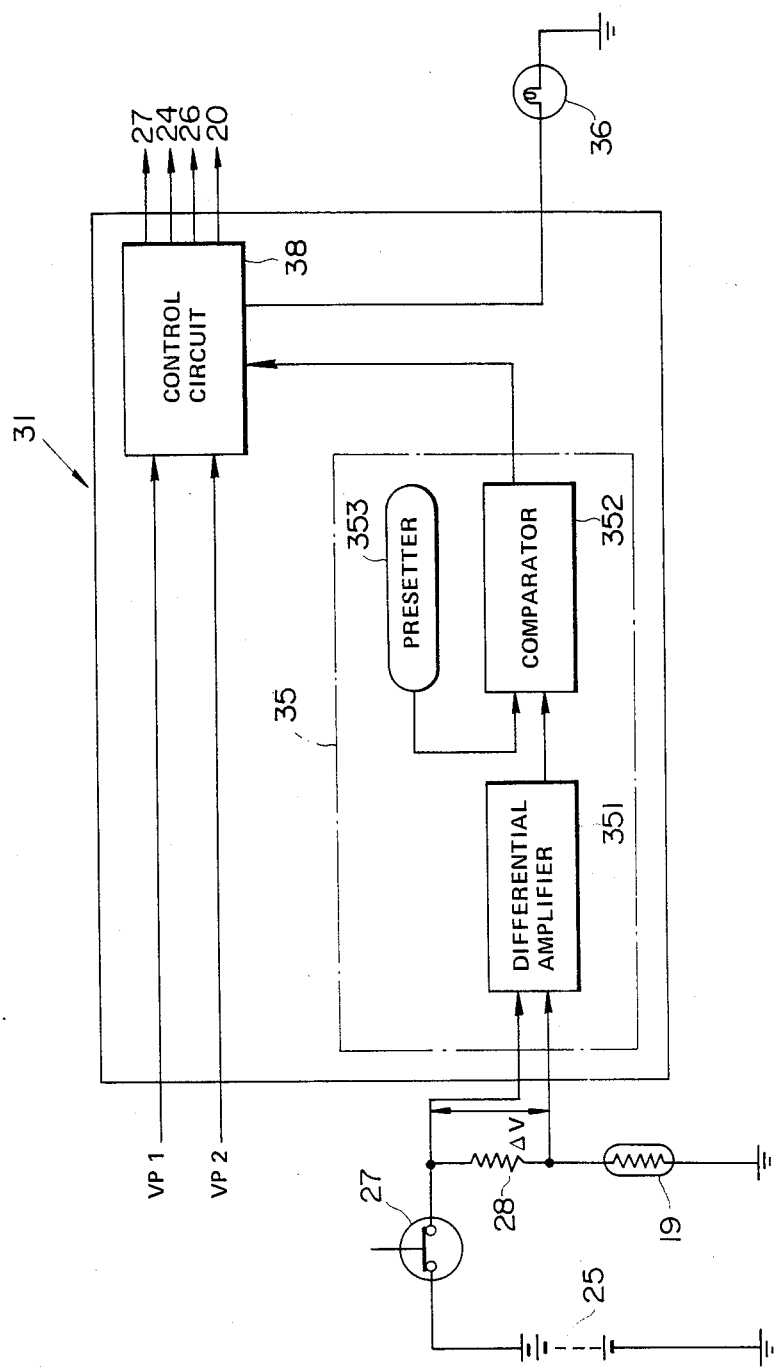

REGENERATIVE BURNER CONTROL APPARATUS

BACKGROUND OF THE INVENTION

This invention relates to an apparatus for controlling the operation of a regenerative burner having a glow plug operable to ignite and burn a combustible mixture supplied into the burner so as to burn the exhaust particles collected in a trap located in the exhaust conduit of an internal combustion engine.

It has been proposed to purify exhaust gases from an automobile internal combustion engine by employing a trap located in the exhaust conduit of the engine to collect therein carbon or other particles included in the exhaust gases. The trap should be repetitively regenerated each time the amount of the exhaust particles collected in the trap reaches a limit value. For this purpose, a regenerative burner is provided upstream of the trap, the regenerative burner including a glow plug operable to ignite and burn a combustible mixture supplied into the burner so as to burn the exhaust particles collected in the trap when a regeneration requirement occurs.

With such a conventional trap regenerative device, however, the regenerative burner has a continuous supply of combustible mixture each time a regeneration requirement occurs even when the glow plug is subject to failure causing a failure to ignite the combustible mixture. The result is a large amount of unburnt fuel sticked on the exhaust system downstream of the regenerative burner, causing an increase in harmful exhaust emissions, exhaust system overheat, and trap burn-out.

Therefore, the present invention provides a regenerative burner control apparatus which can eliminate the difficulties attendant on conventional apparatus by control means operable to prevent the operation of the regenerative burner in the presence of a broken wire in the glow plug.

SUMMARY OF THE INVENTION

There is provided, in accordance with the present invention, an apparatus for use in an internal combustion engine having an exhaust conduit for discharging exhaust particles together with exhaust gases to the atmosphere and a trap located in the exhaust conduit for collecting exhaust particles. The apparatus includes a regenerative burner which includes a mixture supply device operable to supply a combustible mixture into the regenerative burner and a glow plug operable to ignite and burn the combustible mixture supplied into the regenerative burner to burn the exhaust particles collected in the trap so as to regeneate the trap. A failure detector is provided for detecting a broken wire in the glow plug. The failure detector includes means for generating an inhibit signal in the presence of the broken wire in the glow plug. Control means determines a regeneration requirement when the trap collects a predetermined amount of exhaust particles. The control means includes means responsive to the determined regeneration requirement for operating the glow plug and for operating the mixture supply device for a predetermined period of time. The control means also includes means responsive to the inhibit signal from the failure detector for preventing the operation of the mixture supply device.

BRIEF DESCRIPTION OF THE DRAWINGS

The present invention will be described in greater detail by reference to the following description taken in connection with the accompanying drawings, where like reference numerals refer to the same or corresponding parts, and in which:

FIG. 4 is a block diagram showing the details of the failure detecting means of FIG. 3.

DESCRIPTION OF THE PREFERRED EMBODIMENTS

Before describing the specific structural details of the trap regenerative burner control apparatus of the present invention, the principle of determination of a broken wire in a glow plug will be described with reference to the block diagram of FIG. 1 to provide a basis for a better understanding of the function of the trap regenerative burner control apparatus.

Figure 1:
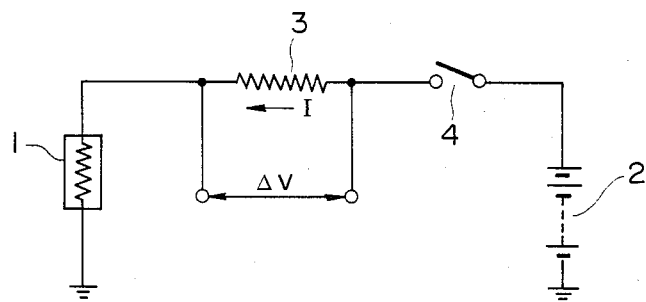
FIG. 1 is a circuit diagram used in explaining the principle of the present invention.

In FIG. 1, the glow plug 1 is connected at its one terminal to a battery 2 through a series connection of a resistor 3 and a switch 4. If the glow plug 1 is in order, a current I will flow through the resistor 3 to the glow plug 1 which thereby operates with red heat upon closure of the switch 4. Under this condition, a potential difference ($\Delta V = I.R$) appears across the resistor 3 having a resistive value of $R\Omega$. If a broken wire exists in the glow plug 1 for any of reasons, no current flow through the resistor and thus no potential difference appears across the resistor 3. Accordingly, the presence of a broken wire in the glow plug 1 can be determined by detecting zero potential difference across the resistor 3.

Figure 2:
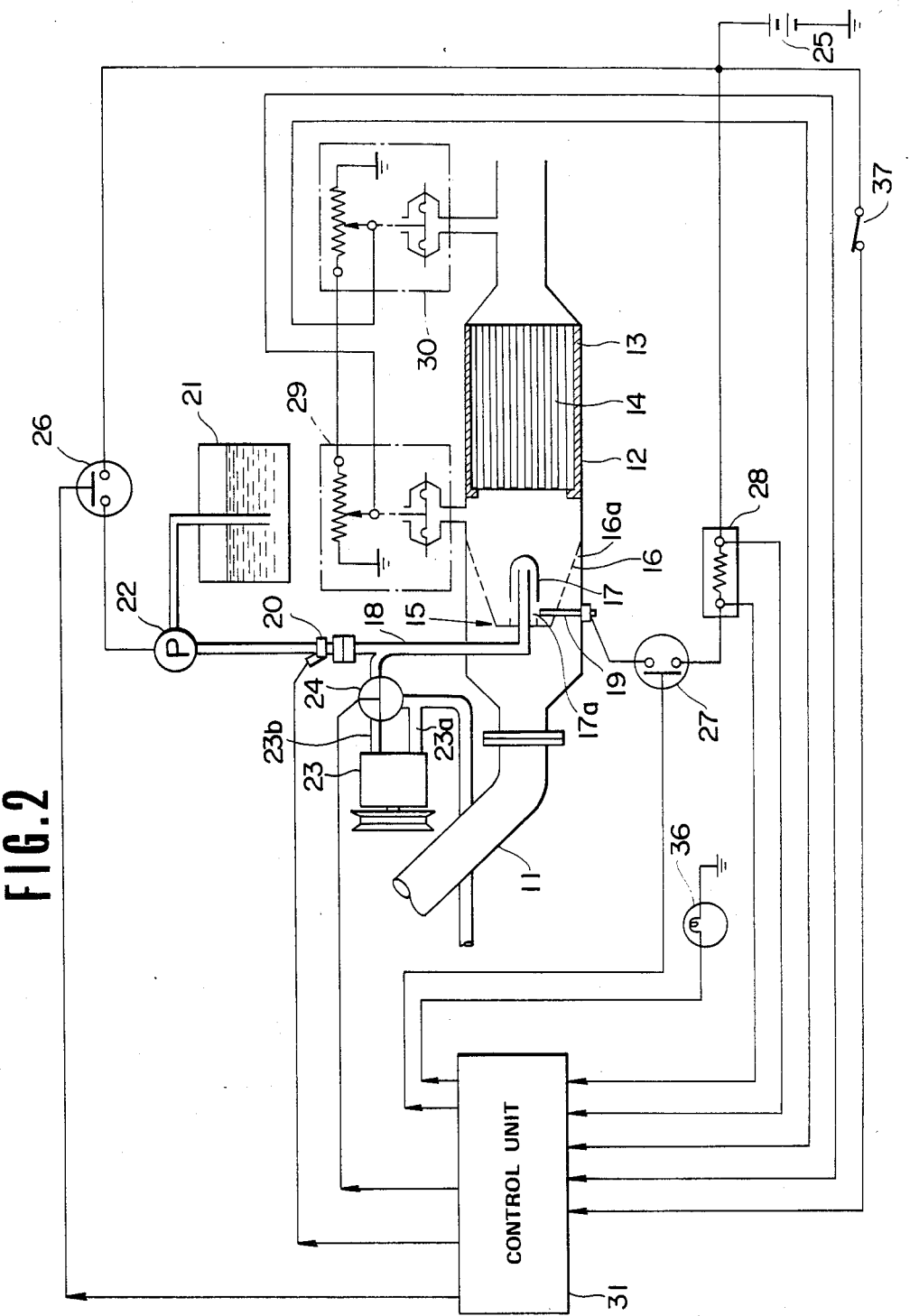
FIG. 2 is a schematic diagram showing one embodiment of a trap regenerative burner control apparatus made in accordance with the present invention.

Referring to FIG. 2, there is illustrated one embodiment of a trap generative device control apparatus made in accordance with the present invention. A trap casing 12 is connected at its inlet end to the exhaust conduit 11 of an internal combustion engine. The trap casing 12 contains a trap or particle filter 14 secured through a buffer member 13 on the inner surface of the trap casing 12. The trap 14 has a honeycomb structure in which a first multiplicity of passageways closed at their inlet ends and a second multiplicity of passageways closed at their outlet ends are arranged alternatively so that exhaust particles can be collected therein while exhaust gases pass through the walls of the adjacent passageways.

A regenerative burner, which is generally designated at 15, is located within the trap casing 12 upstream of the trap 14 and is actuated to burn the exhaust particles collected in the trap 14 so as to regenerate the trap when a regeneration requirement occurs; that is, when a predetermined amount of exhaust particles is collected in the trap 14. The regenerative burner 15 includes a combustion cylinder 16 formed in its peripheral wall with a number of through-holes 16a through which exhaust gases enter the interior of the combustion cylinder 16. The combustion cylinder 16 contains a reverse-flow evaporation cylinder 17 which is formed in its peripheral wall with tiny frame jets 17a. An air-fuel mixture conduit 18 opens into the reverse-flow evaporation cylinder 17. The mixture conduit 18 communicates through a three-way valve 24 with the outlet side of an air pump 23 and also through a fuel injection valve 20 to a fuel pump 22 which is actuated to supply fuel from a fuel tank 21 to the fuel injection valve 20 when a relay controlled switch 26 is closed on command from a control unit 31 to connect the fuel pump 22 to a battery 25.

The fuel injection valve 20 receives fuel injection pulses from the control unit 31 and operates to supply fuel into the mixture conduit 18. The three-way valve 24 is movable between two positions, the first position resulting in connection between the inlet and outlet sides 23a, 23b of the air pump 23. The second position is encountered on command from the control unit 31 to disconnect the inlet and outlet sides 23a and 23b of the air pump 23 and at the same time connect the air pump outlet side 23b to the mixture conduit 18 so as to supply air into the mixture conduit 8 where it is mixed with the fuel supplied through the fuel injection valve 10.

A glow plug 19 is located in the combustion cylinder 16 near the flame jet 17a of the reverse-flow evaporation cylinder 17 and is actuated to increase the temperature in the glow plug 19 to a level sufficient to ignite an air-fuel mixture therein when a relay controlled switch 27 is closed on command from the control unit 31 to connect the glow plug 19 to the battery 25 through a resistor 28. The opposite sides of the resistor 28 are connected to the control unit 31.

A first pressure sensor 29, which includes a diaphragm device and a piezoelectric element shown as a potentiometer, measures the pressure (P1) on the inlet side of the trap 14 within the trap casing 12 and provides a voltage signal ($V_{P1}$) indicative of the measured pressure (P1) to the control unit 31. Similarly, a second pressure sensor 30, which includes a diaphragm device and a piezoelectric element shown as a potentiometer, measures the pressure (P2) on the outlet side of the trap 14 within the trap casing 12 and provides a voltage signal ($V_{P2}$) indicative of the measured pressure (P2) to the control unit 31. The use of these diaphragm devices can minimize the influence of exhaust gas heat on the pressure measurements.

The control unit 31 determines a regeneration requirement based upon the values of the pressure indicative voltage signals ($V_{P1}$) and ($V_{P2}$) and other engine operating parameters including engine load and engine speed and operates the regenerative burner 15 when a regeneration requirement occurs. The control unit 31 also determines the presence of a broken wire in the glow plug 19 based upon the potential difference across the resistor 28 and stops or inhibits the operation of the regenerative burner 15 while at the same time actuating a warning lamp 36 to indicate the glow plug wire brokage to an operator when a broken wire is detected in the glow plug 19. The control unit 31 is connected to the battery 25 through an engine key switch 37.

Figure 3:
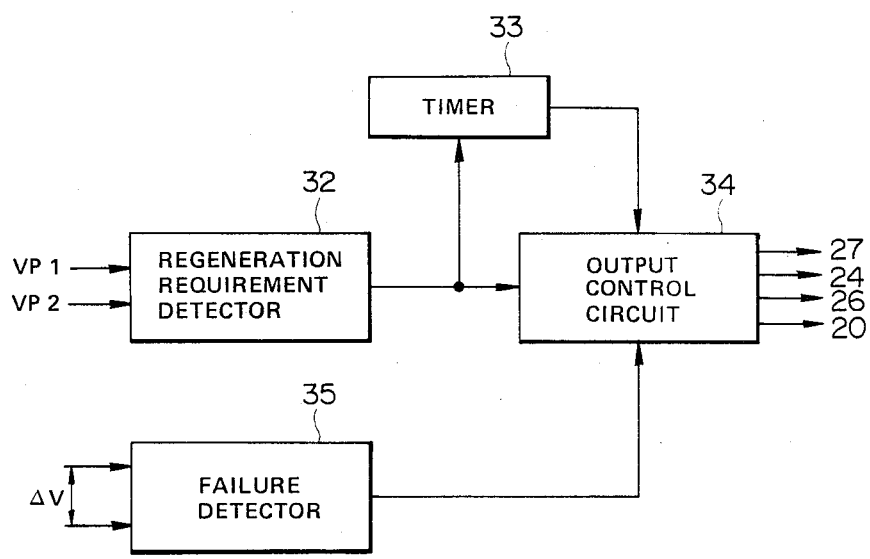
FIG. 3 is a block diagram showing the details of the control unit of FIG. 2.

Referring to FIG. 3, the control unit 31 includes a regeneration requirement determining means 32 which has inputs coupled to the pressure indicative voltage signals ($V_{P1}$) and ($V_{P2}$) from the first and second pressure sensors 29 and 30 and determines a regeneration requirement based upon the values of the pressure indicative signals. The regeneration requirement determining means 32 may be designed to determine a regeneration requirement when the pressure differential ($\Delta P = P1 - P2$) across the trap 14 exceeds a predetermined value, this condition indicating the amount of exhaust particles collected in the trap 14 reaching a limit value. Alternatively, the regeneration requirement determining means 32 determines a regeneration requirement when the pressure differential ($\Delta P$) exceeds a threshold value calculated as a function of the pressure (P1) or when the ratio of the pressure (P2) to the pressure (P1) exceeds a predetermined value in order to increase the reliability of regeneration requirement determination. The regeneration requirement determining means 32 generates a command signal to an output control means 34 and also to a timer 33 when a regeneration requirement is determined. It is to be noted that the pressure differential ($\Delta P$) varies with variations in engine load and/or speed.

Upon receipt of the command signal from the regenerative requirement determining means 32, the output control means 34 operates the regenerative burner 15 so as to regenerate the trap 14 by closing the relay switch 27 to actuate the glow plug 19, shifting the three-way valve 24 to the second position supplying air into the mixture conduit 18, and closing the relay switch 26 to actuate the fuel pump 22 while at the same time applying fuel injection pulses to operate the fuel injection valve 20 so as to supply fuel into the mixture conduit 18. The supply of air and fuel to the mixture conduit 18 are effected with a delay with respect to the actuation of the glow plug 19, the delay being set at a predetermined value permitting the glow plug 19 to increase its temperature to a value sufficient to ignite the air-fuel mixture from the mixture conduit 18. The glow plug 19 is deenergized a predetermined time after its actuation.

The timer 33 starts operating upon receipt of the command signal from the regenerative requirement determining means 32 and generates a stop signal to the output control means 34 with a delay with respect to the leading edge of the command signal applied thereto. The output control means 34 is responsive to the stop signal from the timer 33 to terminate the operation of the regenerative burner 15 by returning the three-way valve 24 to its first position and opening the relay switch 26 and terminating the supply of fuel injection pulses to the fuel injection valve 20.

A failure detecting circuit 35 has inputs coupled across the resistor 28 and generates an inhibit signal to the output control means 34 when the voltage difference ($\Delta V$) across the resistor 28 is below a predetermined value. The output control means 34 has an input coupled to the output of the failure detecting circuit 35. The output control means 34 terminates the operation of the regenerative burner 15 by returning the three-way valve 24 to its first position and operating the relay switch 26 and opening the relay switch 26 and stopping the supply of fuel injection pulses to the fuel injection valve 20 while at the same time actuating the warning lamp 36 to indicate a glow plug wire brokage when an inhibit signal appears at the output of the failure detecting circuit 35 during the relay switch 27 being at its closed position.

Referring to FIG. 4, the failure detecting circuit 35 includes a differential amplifier 351 which has inputs connected across the resistor 28 connected at its one terminal to the battery 25 through the relay switch 27 and connected at another terminal to the glow plug 19. The differential amplifier 351 generates at its output a voltage signal indicative of the voltage difference ($\Delta V$) across the resistor 28 when the relay switch 27 is closed. The output of the differential amplifier 351 is coupled to one input of a comparator 352, another input of which is connected to a preset circuit 353. The comparator 352 compares the value of the voltage signal from the differential amplifier 351 with a value preset in the preset circuit 353 and generates at its output an inhibit signal when the value of the voltage signal from the differential amplifier 351 is below the preset value. The output of the comparator 352 is connected to one input of a control circuit 38 which may be considered as including the regeneration requirement determining means 32, the timer 33, and the output control means 34 of FIG. 3. The control circuit 38 terminates the operation of the regenerative burner 15 and actuates the warning lamp 36 when an inhibit signal appears at the output of the failure detecting circuit 35 during the relay switch 27 being at its closed position. The control circuit 38 may includes a digital computer capable of performing the arithmetic calculation of addition, subtraction, multiplication, and division on binary numbers.

The operation is as follows:

Assuming first that the glow plug 19 is in order, the regeneration requirement determining circuit 32 generates a command signal to the control circuit 34 based upon the voltage signals ($V_{P1}$) and ($V_{P2}$) from the first and second pressure sensors 29 and 30 when the amount of exhaust particles collected in the trap 14 is determined as exceeding a limit value. The generated command signal causes the output control circuit 34 to close the relay switch 27 so as to connect the glow plug 19 to the battery 25. As as result, the glow plug 19 operates with red heat and a voltage difference appears across the resistor 28. Since the voltage difference ($\Delta V$) across the resistor 28 is higher than the preset value under this condition, the comparator 352 generates no inhibit signal. In the absence of an inhibit signal, the output control circuit 34 shifts the three-way valve 24 to the second position supplying air from the air pump 23 into the mixture conduit 18 and closes the relay switch 26 to cause the fuel pump 22 to supply fuel from the fuel tank 21 to the fuel injection valve 20 while at the same time supplying fuel injection pulses to operate the fuel injection valve 20 so as to supply fuel into the mixture conduit 18 where it is mixed with the air supplied thereinto. The resulting air-fuel mixture discharges into the reverse-flow evaporation cylinder 17 and flows through the frame jets 17a into the combustion cylinder 16 where it is ignited and burnt by the glow plug 19 operating with read heat. The burnt air-fuel mixture heats the exhaust gases introduced through the through-holes 16a into the combustion cylinder 16 to produce a hot gas flow into the trap 14 to burn the exhaust particles collected in the trap 14 so as to regenerate the trap 14.

The output control circuit 34 opens the relay switch 27 to disconnect the glow plug 19 from the battery 25 a predetermined time after the closure of the relay switch 27. Thereafter, the air-fuel mixture discharged into the reverse-flow evaporation cylinder 17 is ignited and burnt by the evaporation cylinder 17 which has been heated with red heat so as to continue the regeneration of the trap 14.

The output control circuit 34 shifts the three-way valve to the first position stopping the supply of air into the mixture conduit 18, while at the same time opens the relay switch 26 to stop the fuel supply to the fuel injection valve 20 and stops the supply of fuel injection pulses to the fuel injection valve 20 so as to terminate the supply of fuel into the mixture conduit 18, thereby terminating the operation of the regenerative burner 15 a predetermined time after the glow plug 19 being disconnected from the battery 25.

If any broken wire is found in the glow plug 19, the voltage difference across the registor 28 is zero even when the relay switch 27 is closed. As a result, the output of the differential amplifier 351 is zero and thus the comparator 352 generates at its output an inhibit signal. This inhibit signal causes the output control circuit 34 to inhibit or terminate the regeneration of the trap 14 and also to actuate the warning lamp 36 to provide a light indication of glow plug wire brokage to the operator.

Figure 5:
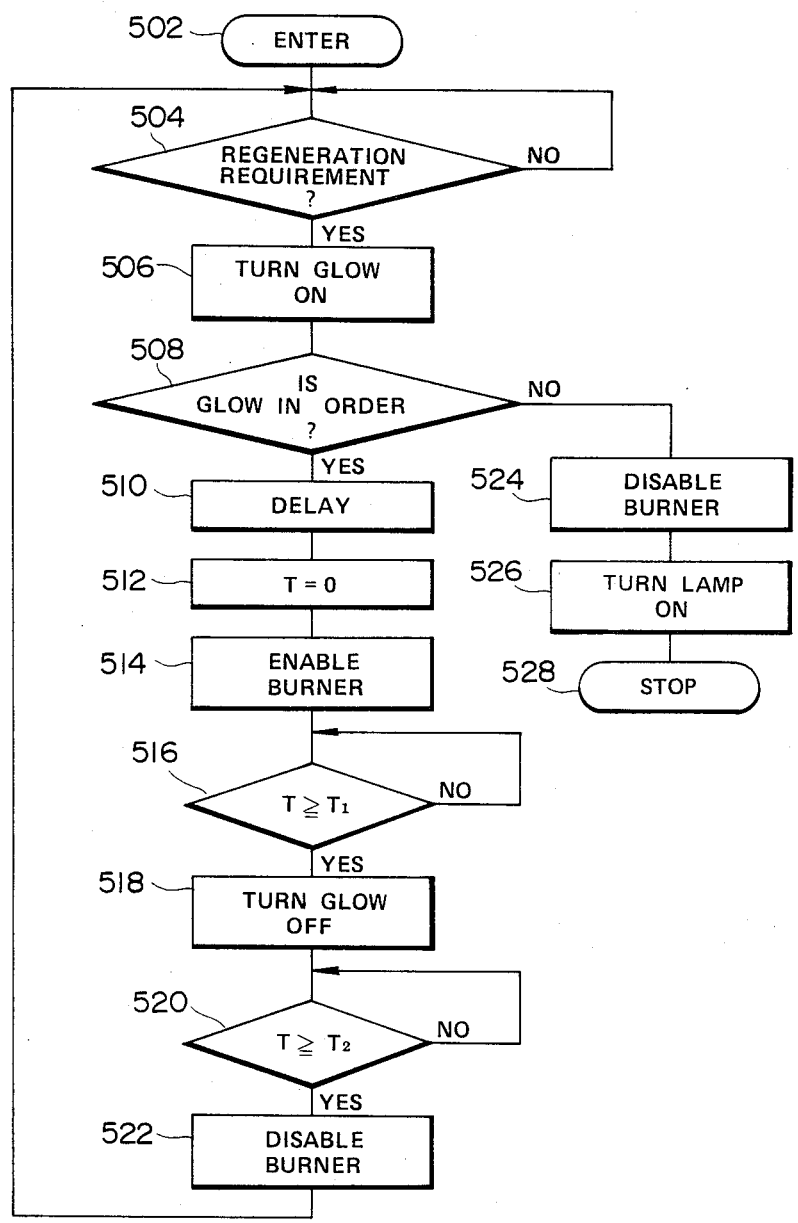
FIG. 5 is a flow diagram illustrative of the operation of the digital computer used in the control circuit of FIG. 4.

FIG. 5 is a flow diagram of the programming of the digital computer includes in the control circuit of FIG. 4. The computer program is entered at the point 502. At the point 504 in the program, a determination is made as to whether a determination requirement occurs. To make this determination, the computer converts the voltage signals ($V_{P1}$) and ($V_{P2}$) into digital form and reads them into the computer memory.

If the answer to this question is "no", then the program returns to the point 504. If a regeneration requirement occurs, then the program proceeds to the point 506 where the computer generates a command to close the relay switch 27 so as to connect the glow plug 19 to the battery 25. At the following point 508, a determination is made as to whether the glow plug 19 is in order. To make this determination, the computer detects the presence of an inhibit signal at the output of the failure detecting circuit 35. If no inhibit signal is generated from the failure detecting circuit 35, then it means that the glow plug 19 is in order and the program proceeds to the point 510. After a delay sufficient for the glow plug 19 to operate with red heat, the program proceeds to the point 512 where the timer is set at T=0.

At the point 514 in the program, the computer generates commands to operate the regenerative burner 15 by moving the three-way valve 24 to the second position supplying air into the mixture conduit 18, closing the relay switch 26 to cause the fuel pump 22 to supply fuel to the fuel injection valve 20, and supplying fuel injection pulses to operate the fuel injection valve 20 so as to supply fuel into the mixture conduit 18.

At the point 516 in the program, a determination is made as to whether the time period during which the trap regeneration continues exceeds a predetermined time T1. If the answer to this question is "no", then the program returns to the point 516. Otherwise, at the point 518, the computer generates a command to open the relay switch 27 so as to disconnect the glow plug 19 from the battery 25.

At the point 520 in the program, another determination is made as to whether the time period during which the trap regeneration continues exceeds a predetermined time T2 greater than the time T1. If the answer to this question is "no", then the program returns to the point 520. Otherwise, the program proceeds to the point 522 where the computer generates commands to terminate the operation of the regenerative burner 15 by moving the three-way valve 24 to the first position stopping the air supply to the mixture conduit 18, opening the relay switch 26 to stop the fuel supply to the fuel injection valve 20, and stop the supply of fuel injection pulses to the fuel injection valve 20. Following this, the program returns to the point 504.

If the answer to the question at the point 508 is "no", then it means that there is a broken wire in the glow plug 19 and the program proceeds to the point 524 where the computer generates commands to inhibit the operation of the regenerative burner 15. At the point 526, the warning lamp 36 is actuated to provide an indication of this condition to the operator. Following this, the program proceeds to the point 522 where it waits for the operator to replace the glow plug 19 with a new one.

Although in this programming, detection of glow plug wire brokage is made only at the start of the regeneration of the trap 14, it is to be understood that the glow plug wire brokage may be detected repetitively for the time T1 during which the relay switch 27 is closed to connect the glow plug 19 to the battery 25.

Although the present invention has been described in connection with specific embodiments thereof, it is evident that many alternatives, modifications and variations will be apparent to those skilled in the art. Accordingly, it is intended to embrace all alternatives, modifictions and variatons that fall within the spirit and broad scope of the appended claims.

What is claimed is:

1. An apparatus for use in an internal combustion engine having an exhaust conduit for discharging exhaust particles together with exhaust gases to the atmosphere, and a trap located in said exhaust conduit for collecting exhaust particles, said apparatus comprising:
   (a) a regenerative burner including a mixture supply device operable to supply a combustible mixture into said regenerative burner, and a glow plug operable to ignite and burn the combustible mixture supplied into said regenerative burner to burn the exhaust particles collected in said trap so as to regenerate said trap;
   (b) a failure detector for detecting a broken wire in said glow plug, said failure detector including means for generating an inhibit signal in the presence of the broken wire in said glow plug; and
   (c) first means for determining a regeneration requirement when said trap collects a predetermined amount of exhaust particles;
   (d) a second means responsive to the determined regeneration requirement for operating said glow plug and for operating said mixture supply device for a predetermined period of time;
   (e) third means responsive to the inhibit signal from said failure detector for preventing the operation of said mixture supply device.

2. The apparatus of claim 1, wherein said third means includes means responsive to said inhibit signal for providing an indication of the broken wire in said glow plug.

3. The apparatus of claim 1, wherein said third means includes a switch connected between said glow plug and a source of voltage, and means responsive to the determined regeneration requirement for closing said switch for a predetermined period of time.

4. The apparatus of claim 3, wherein said failure detector comprises a resistor connected in series with said switch, means for measuring the voltage difference across said resistor, and means for generating the inhibit signal when the measured voltage differnce is below a predetermined value.

5. The apparatus of claim 4, wherein said third means includes means responsive to the inhibit signal generated from said failure detector only for the predetermined time period during which said switch is closed for preventing the opertion of said mixture supply device.

6. The apparatus of claim 5, wherein said third means includes means responsive to the inhibit signal generated from said failure detector only for the predetermined time period during which said switch is closed for providing an indication of the broken wire in said glow plug.

* * * * *